Oct. 11, 1966  R. H. HEDRICK  3,277,667
FREEZING
Filed June 3, 1964  2 Sheets-Sheet 2

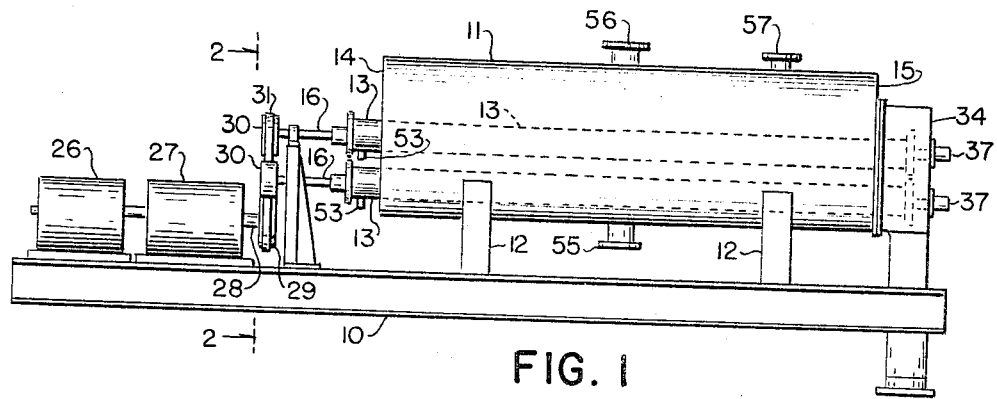
FIG. 1
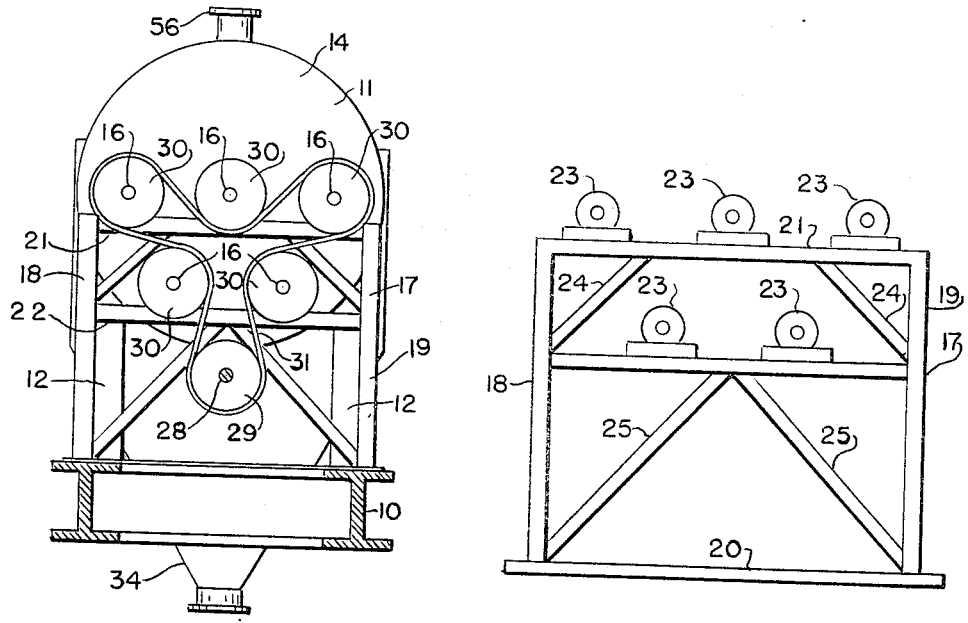
FIG. 2
FIG. 3

United States Patent Office 3,277,667
Patented Oct. 11, 1966

1

3,277,667
FREEZING
Robert H. Hedrick, Warren, Pa., assignor to Struthers Scientific and International Corporation, New York, N.Y., a corporation of Delaware
Filed June 3, 1964, Ser. No. 372,145
4 Claims. (Cl. 62—343)

This invention relates in general to the freeze concentration of solutions and, more particularly, to an apparatus for producing crystals in a relatively concentrated or viscous solution.

A simple crystallizer consists of a tube which is cooled on the outside and through which fluid is passed to freeze and form ice crystals. One problem which arises in such a crystallizer is the tendency of the ice or other crystals to form against and adhere to the walls of the crystallizer. This problem has been overcome, in the past, by scraping the inner walls of the crystallizer. However, when ice crystals are scraped and broken from the walls of a crystallizer, the resulting crystals are small and irregular in size. Further, the scraping of crystals from the walls of a crystallizer wastes the energy required to break the crystals away. In addition, while the crystals adhere to the crystallizer walls, they reduce the transfer of heat through the walls.

In the freeze concentration of comestibles, such as orange juice, apple juice, coffee extract, and the like, the ice crystals must be filtered or centrifuged from the solution being concentrated in the freeze concentration process. Irregular and small crystals are difficult and may even be impossible to efficiently separate from solution. Thus it is desirable to provide an apparatus which will produce larger and more uniform crystals.

It has been found that properly designed agitator blades may be used to remove the stagnant supercooled layer of fluid adjacent to the crystallizer walls before it freezes and forms ice crystals on the walls. The supercooled liquid removed from the walls must be adequately mixed with the solution passing through the crystallizer so that the supercooled fluid will cause growth of existing crystals. Without adequate mixing, the supercooled liquid will nucleate to produce additional crystals. This reduces the size of the crystals grown. Proper mixing of more viscous solutions, such as an aqueous solution of over 30 percent coffee extract, is difficult to obtain within a crystallizer while agitating the solution within the crystallizer to prevent the formation of ice crystals on its walls.

It is, therefore, an object of this invention to provide an apparatus for growing larger and more uniform crystals in concentrated solutions.

Another object of this invention is to provide a tubular crystallizer for the freeze concentration of relatively viscous solutions of comestibles.

A further object of this invention is to provide a tubular crystallizer for relatively concentrated solutions, the crystallizer having an internal agitator which does not scrape the wall of the crystallizer while preventing crystals from forming on the wall.

Still another object of this invention is to provide a less costly, more easily maintained, and more efficient tubular crystallizer containing an internal agitator.

Many other objects, advantages and features of invention reside in the particular construction, combination and arrangement of parts involved in the embodiment of the invention and its practice as will be understood from the following description and accompanying drawing wherein:

FIGURE 1 is a side view of a crystallizer according to this invention;

2

FIGURE 2 is a vertical section taken on line 2—2 of FIGURE 1;

FIGURE 3 is a front elevation of the agitator shaft bearing support frame;

Figure 4:
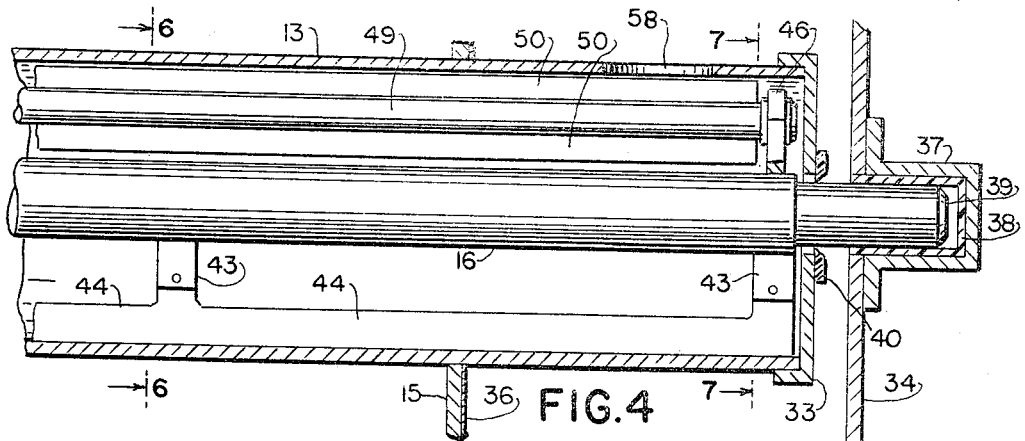
FIGURE 4 is a longitudinal vertical section through a fragment of the discharge end of the crystallizer of FIGURE 1 with a crystallizer tube broken away in section.

Referring to the drawing in detail, FIGURES 1 and 2 show the generally rectangular base 10 above which the crystallizer body 11 is supported by the four legs 12. Five crystallizer tubes 13 extend through the crystallizer body 11 and project beyond its end walls 14 and 15. Agitator shafts 16 extend from the inlet ends of the crystallizer tubes 13.

As shown in FIGURE 3, an agitator shaft bearing support frame 17 has two vertical upright members 18 and 19 extending upward from a base plate 20. Disposed between the upright member 18 and 19 are the upper and lower bearing support members 21 and 22. Three bearings or pillow blocks 23 containing ball bearings are mounted on the upper bearing support member 21 and two bearings or pillow blocks 23 are mounted on the lower bearing support member 22. Pairs of braces 24 and 25 stiffen and strengthen the agitator shaft bearing support frame 17.

Referring again to FIGURES 1 and 2, a motor 26 is mounted on the base 10 to drive the speed reducing unit 27 from which the shaft 28 extends carrying the sprocket 29. Each of the agitator shafts 16 has a sprocket 30 mounted on it. A chain 31 extends about sprocket 29 and winds about the sprockets 30 so that sprocket 29 may drive all the sprockets 30. Any suitable drive means may be used in place of the sprockets 29 and 30 and the chain 31.

Referring now to FIGURE 1 and FIGURE 4, each crystallizer tube 13 extends through the wall 15 of the crystallizer body 11. The end of the crystallizer tube 13 may be threaded to have a correspondingly threaded cover plate 33 screwed in place over it. The agitator shaft 16 extends through the cover plate 33. A discharge housing 34 having a rear wall 35 is placed over the ends of the crystallizer tubes 13 with its front wall 36 disposed against wall 15 of the crystallizer body 11. Bearing caps 37 are bolted to the rear wall 35. The bearing caps 37 contain the Teflon bearings 38 which receive the ends 39 of the shafts 16. A Teflon seal 40 prevents liquid from flowing past the cover plate 33.

Figure 5:
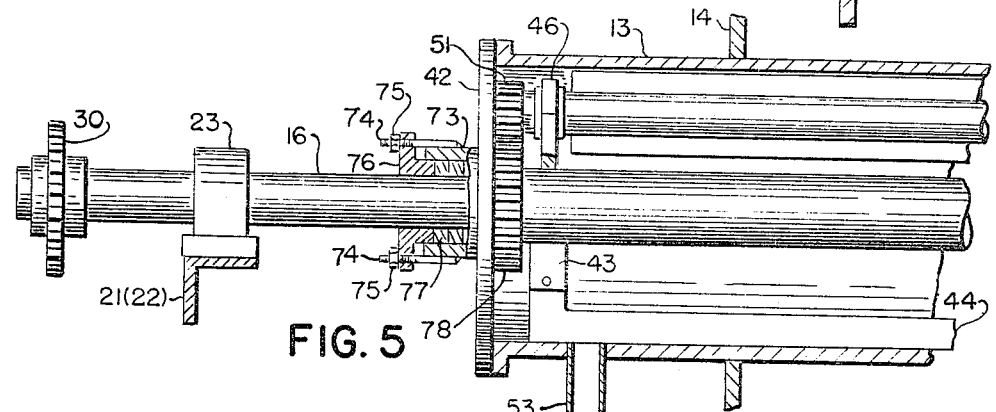
FIGURE 5 is a longitudinal vertical section through a fragment of the inlet end of the crystallizer with a crystallizer tube broken away in section.
Figure 6:
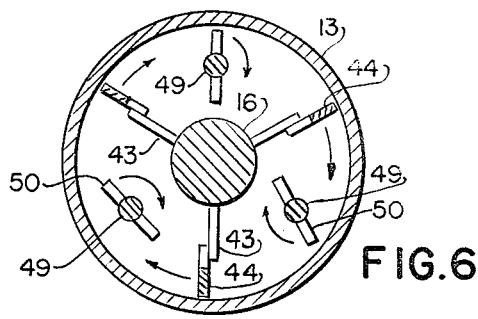
FIGURE 6 is a vertical section taken on line 6—6 of FIGURE 4.
Figure 7:
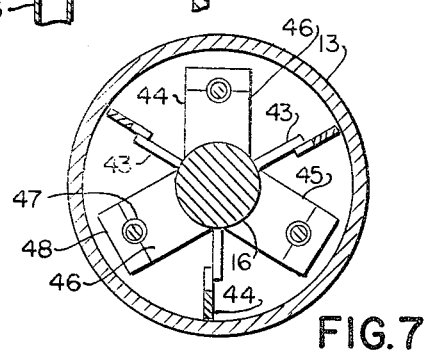
FIGURE 7 is a vertical section taken on line 7—7 of FIGURE 4.
Figure 8:
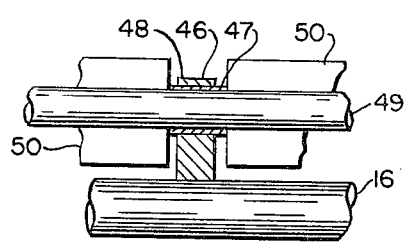
FIGURE 8 is a side view of a fragment of an agitator shaft with a spider arm broken away in section and with a fragment of a planetary shaft and attached blades shown in position.

Referring now to FIGURE 5, each crystallizer tube 13 has its inlet end extend through wall 14 of the crystallizer body 11. A cover plate 42 extends over the end of each tube 13 and has an agitator shaft 16 pass through it. An annuular flange 73 extends about the center of cover 42 and about shaft 16. Bolts 74 are welded to flange 73 so that nuts 75 may be tightened to urge a compression member 76 against the ring type seals 77 which provide for the fluid tight passage of shaft 16 through cover plate 42. A spur gear 78 extends about shaft 16 and is welded or otherwise fixed to cover plate 42.

Referring now to FIGURES 4 through 8, tabs 43 are welded to shaft 16 in rows along its length disposed equidistant from each other. Agitator blades 44 are bolted or otherwise fixed to the tabs 43 to extend with a slight clearance from the inner surface of the crystallizer tube 13. A number of spiders 45 having three arms 46 are welded or otherwise fixed to shaft 16. Each arm 46 has a bearing 47 secured to it by means of a bearing cap 48 which may be bolted in place. Planetary shafts 49 are rotatably journalled in the bearings 47 and have a pair of planetary blades 50 fixed to extend from them. On the inlet end of each planetary shaft 49 there is mounted a spur gear 51 which engages the fixed gear 78. Thus it may be seen that rotation of shaft 16 causes the planetary rotation of shafts 49 and blades 50 between the blades 44.

As shown in FIGURES 1, 4 and 5, a viscous fluid to be concentrated is introduced through the inlet tubes 53. A cooling medium or refrigerant is passed through the fittings 55, 56 and 57 and the crystallizer body 11 to cool the crystallizer tubes 13. A relatively large upwardly facing discharge aperture 58 is formed in each crystallizer tube 13 within the discharge housing 34. Thus a slurry of liquid and ice crystals passes through the crystallizer tubes 13 to fall downward within the discharge housing to be collected and have the ice crystals removed from it.

This invention enjoys many advantages when growing crystals in relatively concentrated or viscous solutions. For cleaning purposes or for adjustment or replacement of the blades 44 and 50, the agitator shafts 16 with the attached planetary shafts 49 may be easily removed from either end of the apparatus. Since the entire drive for the planetary shafts 49 is within the crystallizer tubes 13, the problem of sealing the drive ends of the tubes 13 to render them fluid tight is simplified. Since the gears 78 and 51 are disposed within the tubes 13 beyond the crystallizer body 11 in the inlet end, ice crystals will not form about the gears to jam them. While the solution passing through the crystallizer tubes 13 completely fills them, it may readily escape through the large opening 72 with minimal hydraulic friction.

To prevent the formation of ice crystals on the inner surfaces of the crystallizer tubes, the blades 44 should extend to within 1/16 inch of these surfaces. Even in very viscous solutions the blades 44 will then swirl the subcooled film from the walls of the crystallizers 13 so that crystals cannot form on them. However, without the planetary blades 50, insufficient mixing of the subcooled fluid and the solution will take place to obtain growth on existing nuclei. Even in the most viscous solutions, the planetary blades 50 promote sufficient mixing of the subcooled liquid to cause growth on existing nuclei rather than allowing additional nucleation to take place.

While the crystallizer of this invention is particularly suitable for growing crystals of greater size and uniformity in more concentrated solutions, it may also be used with less concentrated solutions with good effect.

Although this invention has been shown and described in the best form known, it will nevertheless be understood that this is purely exemplary and that modifications may be made without departing from the spirit and scope of the invention except as it may be more limited in the appended claims.

I claim:

1. A crystallizer tube comprising, in combination, a cylindrical tube having an inner surface and having an inlet at one end and an outlet at the other end, means directing a cooling agent against the outside of said tube, main blades disposed in said tube, said main blades being rotatably mounted and having outer edges disposed with clearance less than one-sixteenth inch from the inner surface of said tube, means rotating said main blades within said tube, rotatably mounted planetary blades disposed between said main blades, and means rotating said main blades about the inner surface of said tube and rotating said planetary blades between said main blades.

2. A crystallizer for viscous fluids and concentrated solutions comprising, in combination, a crystallizer body, cylindrical crystallizer tubes extending through said crystallizer body, said tubes having inlet ends projecting from one end of said crystallizer body and outlet ends containing upwardly facing openings projecting from the other end of said crystallizer body, said tubes having an inner surface, means directing a cooling agent through said crystallizer body, a discharge housing disposed about the outlet ends of said tubes, an agitator shaft extending through each of said tubes, main blades fixed to said agitator shafts, said main blades having outer edges disposed with slight clearance from the inner surfaces of said tubes, arms extending from said agitator shafts between said main blades, planetary shafts rotatably mounted by said arms between said main blades, planetary blades fixed to and extending from said planetary shafts, a fixed gear disposed about said agitator shaft, planetary gears mounted on said planetary shafts, said planetary gears each engaging one of said fixed gears, and means rotating said agitator shafts moving said main blades about the inner surface of said tubes and rotating said planetary blades between said main blades within said tubes.

3. The combination according to claim 2 wherein said fixed gears and said planetary gears are disposed within the inlet ends of said tubes outside said crystallizer body.

4. A crystallizer for viscous fluids and concentrated solutions comprising, in combination, a crystallizer body, cylindrical crystallizer tubes extending through said crystallizer body, said tubes having inlet ends projecting from one end of said crystallizer body and outlet ends containing upwardly facing openings projecting from the other end of said crystallizer body, a discharge housing disposed about the outlet ends of said tubes, an agitator shaft extending through each of said tubes and having an end extend outward past the inlet end of each of said tubes, three equidistant main blades fixed to each of said agitator shafts, said main blades having outer edges disposed with slight clearance from the inner surfaces of said tubes, arms extending from said agitator shafts between said main blades, three planetary shafts rotatably mounted in said arms between said main blades in each of said tubes, a pair of planetary blades fixed to and extending from each of said planetary shafts, a fixed gear disposed about each of said agitator shafts within the inlet end of each of said tubes, a planetary gear mounted on each of said planetary shafts within the inlet ends of said tubes, said planetary gears engaging said fixed gears, transmission means mounted on the ends of said agitator shafts extending outward past the inlet ends of each of said tubes, and drive means driving said transmission means rotating said agitator shafts moving said main blades about the inner surfaces of said tubes and rotating said planetary blades between said main blades within said tubes.

References Cited by the Examiner

UNITED STATES PATENTS

| 471,337 | 3/1892 | Humphreys | 259—102 |
| 2,263,794 | 11/1941 | Wyen | 62—342 X |
| 2,767,553 | 10/1956 | Lewis | 62—342 X |

FOREIGN PATENTS

| 667,863 | 3/1952 | Great Britain. |

ROBERT A. O'LEARY, *Primary Examiner.*

MEYER PERLIN, *Examiner.*

N. R. WILSON, *Assistant Examiner.*